Figure 1:
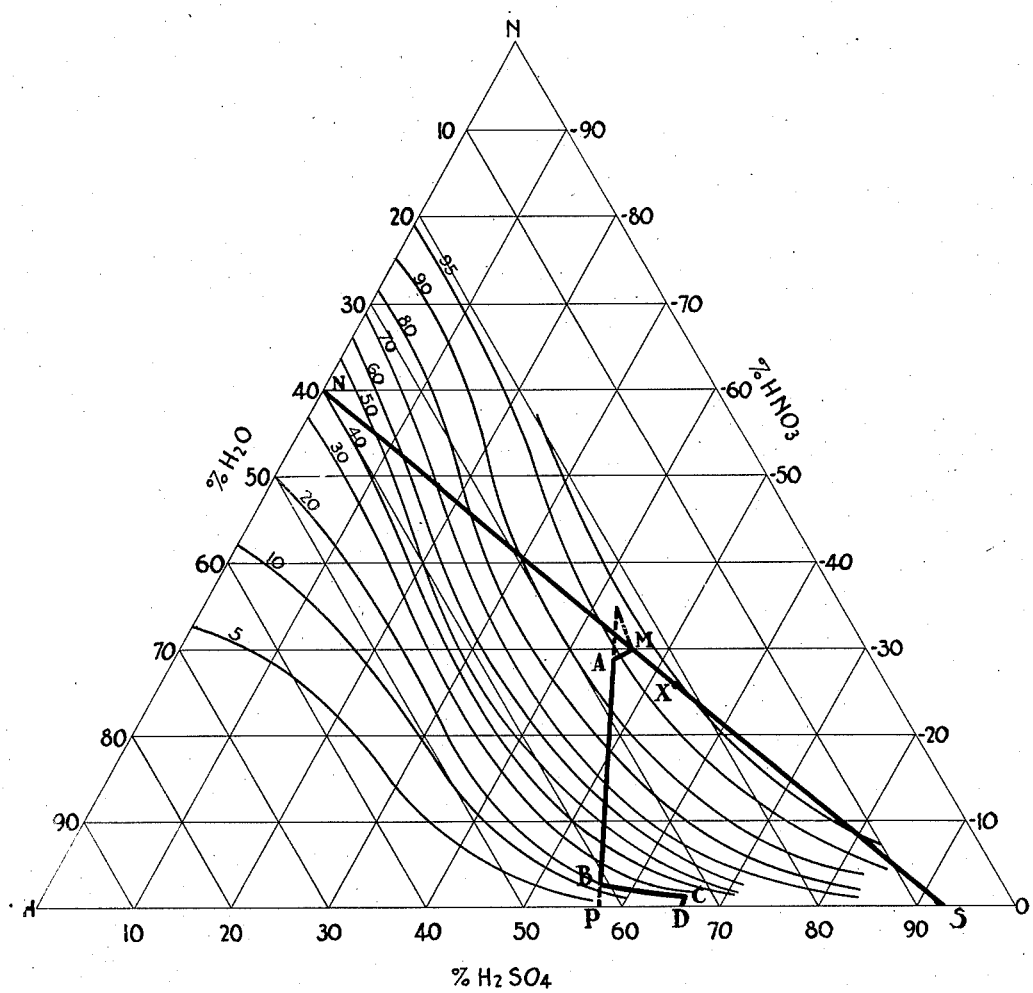

Stanley L. Handforth, Inventor

By his attorney

Aug. 15, 1933.  S. L. HANDFORTH  1,922,289
PROCESS FOR CONCENTRATING NITRIC ACID
Filed Feb. 18, 1930   2 Sheets-Sheet 2

Stanley L. Handforth, Inventor

By his attorney

Patented Aug. 15, 1933

1,922,289

UNITED STATES PATENT OFFICE 1,922,289

PROCESS FOR CONCENTRATING NITRIC ACID

Stanley L. Handforth, Woodbury, N. J., assignor to E. I. du Pont de Nemours & Company, Wilmington, Del., a Corporation of Delaware Application February 18, 1930. Serial No. 429,308

4 Claims. (Cl. 23—160)

This invention relates to an improved process for concentrating nitric acid and more particularly to a process in which a minimum amount of dehydrating agent is required. This invention is also applicable to the denitration of certain kinds of waste acids with the production of strong nitric acid.

In order to produce strong nitric from weak acid, some form of dehydrating agent is required. For this purpose, sulfuric acid has been the most commonly used material. Other dehydrating agents, however, such as calcium nitrate or phosphoric acid may be used. The cost of concentrating weak nitric acid depends largely on the amount of dehydrating agent necessary and on the amount of excess water with which it becomes diluted, since it must either be reconcentrated or sold as a product of lower value than the original concentrated form. In order to recover the value of the dehydrating agent, particularly where sulfuric acid is used, it must leave the process free of nitric acid.

Several processes have been advanced for the concentrating of weak nitric acid by means of a dehydrating agent such as strong sulfuric acid. The simplest one is to mix the two acids and distill them from a retort, in which case the first part of the distillate is strong nitric acid. A continuous process has been developed by Pauling (U. S. Patent 1,031,865) in which the mixture of weak nitric acid and dehydrating agent is fed into the top of a fractionating column while steam is blown into the bottom to heat the mixture and drive off strong nitric acid. The steam is condensed and absorbed in the dehydrating agent and dilutes it so that an excessive amount of the latter is required. This is due to the fact that if the dehydrating agent is diluted below a certain point, the process cannot be operated to produce a denitrated residual and concentrated nitric at the same time.

Many modifications of the above processes have been proposed but they have resulted in little or no saving in dehydrating agent or have necessitated complicated operation or equipment costly to construct and maintain. A copending application of myself and others (Serial No. 398,148) describes a method which results in a saving in the dehydrating agent required over previous processes and which involves apparatus simpler to construct and to maintain.

In the process of the above copending application 398,148, no external steam is required. Due to the fact, however, that the residual dehydrating agent when denitrated is, in the case of sulphuric acid, approximately 72%, its boiling point is such that rather high steam pressures or a circulated heating medium are necessary to obtain practical temperature differences. With a definite amount of heat to be transferred for a given hourly capacity, the number of heating vessels required is directly dependent on the temperature difference. Since steam pressures of around 200 pounds gage are not generally available, this must be supplied at added cost or replaced by an equally expensive system circulating a separately heated liquid medium.

The present invention has as an object the production of nitric acid of maximum strength in a simple continuous process. A further object of the invention is a reduction in the amount of dehydrating agent required. A still further object of my invention is the obtaining of the dehydrating agent free of nitric acid and diluted with a minimum of extraneous water. Another object is the elimination of special heating means.

These objects may be accomplished by feeding the mixture of weak nitric acid and dehydrating agent to the top of a counter-current apparatus or fractionating tower. In the present specification where a tower is referred to, it is understood to be properly supplied with packing material or fractionating plates, since it is apparent to one skilled in the art that an empty tower would be useless for the purpose described. I do not intend to limit myself to feeding a mixture of weak nitric acid and dehydrating agent since these may also be fed separately and allowed to mix in the tower. Weak nitric acid vapors entering the bottom of the tower heat the mixture flowing downwardly, thereby driving off strong nitric acid which leaves the top of the tower.

The diluted dehydrating agent, still containing some nitric acid, flows from the bottom of the tower into one or more externally-heated vessels. It is boiled and concentrated in these vessels and the vapors of nitric acid and water arising therefrom enter the bottom of the above mentioned tower to heat the liquid mixture flowing down through it. The partially concentrated dehydrating agent still containing a slight amount of nitric acid passes from the boiling vessels into a second fractionating tower. Steam enters the bottom of this tower and drives out the remaining traces of nitric acid from the dehydrating agent. The weak nitric acid vapors leaving the top of this second tower enter the boiling vessels and join with the vapors arising therein. The residual dehydrating agent leaves the bottom of the second tower diluted with only the water contained in the weak nitric acid and with a small amount of steam used in this tower. If it is desired, the steam supplied to this tower may be obtained by boiling the residual dehydrating agent in an externally-heated vessel. In this case the dehydrating agent may be diluted only with the water from the weak nitric acid.

In this way, counter-current fractionation is obtained in the first or dehydrating tower and strong nitric acid is produced from an original mix containing the minimum proportion of dehydrating agent which will give a mixture in equilibrium with strong nitric acid vapors. In flowing down the tower the mixture will absorb and condense steam from the weak nitric vapors rising through the tower. Heat liberated due to this will cause strong nitric vapors to be driven off from the mixture. A point will eventually be reached where the proportion of nitric acid in the mixture is so small and the equilibrium such that this final amount of nitric either cannot be removed in this way or at least its removal would not be economical since an excessively high tower would be required.

The mixture then enters the externally-heated boiling vessels where it is concentrated and water vapor and some of the remaining nitric is removed. This vapor is used as the source of heat for the liquid in the above-mentioned dehydrating tower. When it is attempted to denitrate this solution in one or more boiling vessels, it is found that denitration cannot be obtained, if in the case where the dehydrating agent is sulfuric acid, the concentration of the sulfuric acid is less than 72%. If all the steam and weak nitric vapors evolved in concentrating the residual to this point were allowed to pass up the tower, there would be an excess of steam which would leave the top of the tower and dilute the strong nitric acid unless an excess of dehydrating agent was used. I have found that when the mixture has been partially concentrated in the boiling vessels, it can be passed into another fractionating tower into the bottom of which steam is blown to heat it and complete the denitration of the residual leaving this tower. By this method of operation, the amount of steam and weak nitric vapors generated will be small enough so that all the vapors can be passed into the first dehydrating tower and there will be only the amount necessary to cause the distillation of all the nitric as strong acid without diluting it with excess steam.

This can be best shown by plotting the composition of the mixture at the various points in the process in triangular coordinates. The accompanying graph, forming Figure 1 of the drawings, illustrates an example in which sulfuric acid is used as the dehydrating agent. The graph also shows the strength of nitric vapors in equilibrium with mixtures of nitric acid, sulfuric acid and water of different compositions. Point S represents 93% sulfuric and Point N 60% nitric. It may be noted that a line connecting these two points is the locus of all possible mixtures of the two acids mentioned. The mixture of these represented by point M is a concentrating mix which contains almost the minimum amount of sulfuric while still being in equilibrium with vapors of strong nitric acid. It is proper to assume that this mixture is brought to the boiling point by the condensation of steam. The composition at its boiling point may then be represented by point A.

In passing down the tower, steam will be condensed and nitric vapors driven off and the composition will change about as represented by line AB. The liquid will leave the fractionating tower and enter the series of boiling vessels where it will be concentrated and its composition will change as represented by line BC due to the driving off of weak nitric vapors. If it were attempted to denitrate this original mixture by the introduction of steam according to the process disclosed by Pauling (1,031,865), an excessively high tower would be necessary in order to change the composition as represented by line PB and the result would be a residual excessively diluted by the addition of steam. This water would have to be again removed from the dehydrating agent. If, however, the mixture as represented by point C is allowed to pass into a tower into the bottom of which steam is introduced, the composition will change as represented by line CD and denitration may be obtained in a comparatively short tower, because this mixture while it contains very much less nitric acid is still in equilibrium with about as strong vapors as the mixture represented by point B. In any method of concentrating previously proposed, in order to obtain strong nitric acid, a mixture corresponding to point X has had to be used with the result that a much larger amount of dehydrating agent has been required than is required in my process. An alternative process comprises taking a portion of the nitric acid as a so-called weak fraction of high dilution but this procedure complicates the operation.

Figure 2:
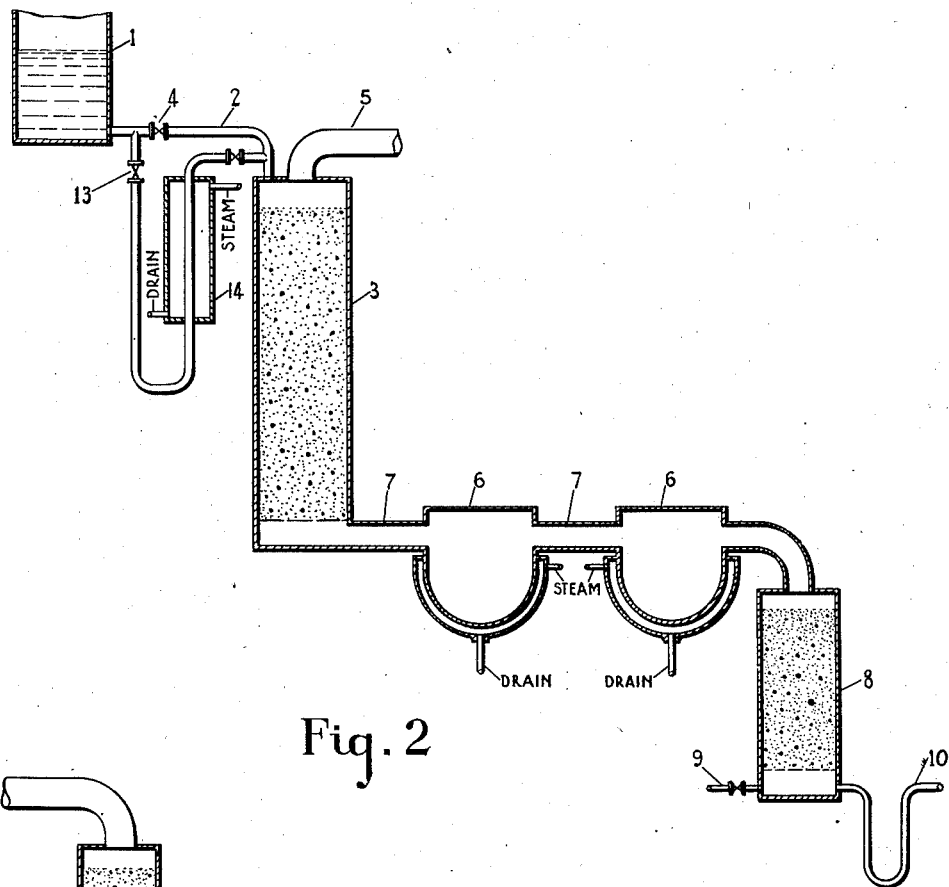
Figure 3:
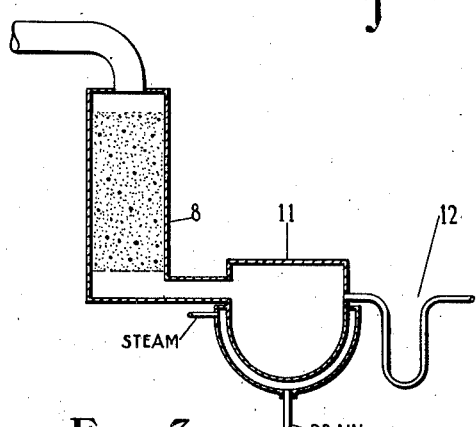

Figures 2 and 3 of the accompanying drawings illustrate one method of carrying out my invention. Figure 2 illustrates a method of operation where some steam is used. Figure 3 in combination with Figure 2 represents a modified method of operation using no outside steam. Other methods and types of construction within the scope of my invention will naturally suggest themselves to those skilled in the art. In the drawings, the mixture of weak nitric acid and dehydrating agent is fed from vessel 1 through conduit 2 into the fractionating or dehydrating tower 3. For example, a mixture containing 30% $HNO_3$, 47% $H_2SO_4$ and 23% $H_2O$ may be used. The rate of flow is controlled by valves 4 or 13. The strong nitric acid vapors arising from the tower pass out through conduit 5 to the usual bleaching and condensing equipment. The liquid leaving the bottom of the tower 3 and still containing appreciable quantities of nitric acid, (for instance 3% $HNO_3$, 57% $H_2SO_4$ and 40% $H_2O$) enters the externally heated vessels 6 through conduit 7 where nitric acid and water vapors are distilled. Heat is supplied by steam in the jackets of the vessels 6. The vapors arising in these vessels pass back into the tower through conduit 7. The partially concentrated residual, still containing some nitric acid, (for instance 0.2% $HNO_3$, 66% $H_2SO_4$ and 33.8% $H_2O$) leaves the boiling vessels and enters the fractionating tower 8. Steam enters the bottom of the tower through pipe 9 and flows upward through the tower counter-current to the liquid and drives the remaining traces of nitric from the liquid. The denitrated residual (66% $H_2SO_4$ and 34% H₂O) leaves the system through pipe 10.

In this system, the residual acid is diluted by the small amount of external steam injected into the bottom of tower 8. This can be avoided by passing the residual from tower 8 into another externally heated boiling vessel as shown at 11 in Figure 3. The steam given off from the boiling residual is then used in tower 8 and the denitrated residual (68.5% H₂SO₄ and 31.5% H₂O) leaving through pipe 12 contains only the water originally present in the weak nitric acid since no additional steam has been injected into the system.

The towers mentioned above may be any type of acid fractionating tower. They may either be constructed of acid resistant iron or chemicalware, filled with suitable packing material or fractionating plates to give the necessary scrubbing action. It will also be apparent that the two towers may be built on top of one another with the boiling vessel built into the towers. The boiling vessels 6 and 11 may be jacketed tubes arranged in cascade and heated by steam or hot liquid; they may be tubes arranged in cascade in a furnace, stills arranged in a furnace or jacketed or even a heating section in the tower. The number of vessels in cascade 6 is immaterial. In some cases, better operation and increased capacity can be obtained by heating the mixture introduced to the top of the fractionating tower 3. This may be accomplished by passing the feed through a heated conduit or preheater 14 instead of through valve 4. In some cases, the heat of dilution of the dehydrating agent may be utilized by introducing the strong dehydrating agent and dilute nitric acid separately into tower 3 and allowing them to mix in the tower. While I prefer to pass the vapors continuously counter-current to the liquid through the whole apparatus as shown, it will not interfere with the operation of the process if the vapors from the top of tower 8 are led directly into the bottom of tower 3.

As many apparently widely different embodiments of this invention may be made without departing from the spirit thereof, it is to be understood that I do not limit myself to the foregoing examples or descriptions except as indicated in the following patent claims:

I claim:

1. The process of concentrating nitric acid which comprises passing a mixture of dilute nitric acid and a dehydrating agent through a fractionating tower, driving off therefrom strong nitric acid vapors, passing the residual mixture from said fractionating tower still containing some nitric acid into a series of boiling vessels to drive off further nitric acid and to partially concentrate the dehydrating agent, passing the mixture from said boiling vessels still containing some nitric acid into a second fractionating tower so as to drive off the remaining nitric acid, and retaining all the weak nitric vapors in the system by returning them to the first fractionating tower through the series of boiling vessels in counter-current contact flow with the oncoming mixture of liquids to assist in heating the liquid therein.

2. The process of concentrating nitric acid which comprises passing a mixture of dilute nitric acid and a dehydrating agent through a fractionating tower, driving off therefrom strong nitric acid vapors, passing the residual mixture from said fractionating tower still containing some nitric acid into a series of boiling vessels to drive off further nitric acid and to partially concentrate the dehydrating agent, passing the mixture from said boiling vessels still containing some nitric acid into a second fractionating tower so as to drive off the remaining nitric acid, and retaining all the weak nitric vapors in the system by returning them to the first fractionating tower in counter-current contact flow with the oncoming mixture of liquids.

3. The process of concentrating nitric acid which comprises passing a mixture of dilute nitric acid and a dehydrating agent through a fractionating tower, driving off therefrom strong nitric acid vapors, passing the residual mixture from said fractionating tower still containing approximately 3% HNO₃, 57% H₂SO₄ and 40% H₂O into a series of boiling vessels to drive off further nitric acid and to partially concentrate the dehydrating agent, passing the mixture from said boiling vessels still containing approximately 0.2% HNO₃, 66% H₂SO₄ and 33.8% H₂O into a second fractionating tower so as to drive off the remaining nitric acid, and retaining all the weak nitric vapors in the system by returning them to the first fractionating tower in counter-current contact flow with the oncoming mixture of liquids.

4. The process of concentrating nitric acid which comprises passing a mixture of dilute nitric acid and a dehydrating agent through a fractionating tower, driving off therefrom strong nitric acid vapors, passing the residual mixture from said fractionating tower still containing some nitric acid into a series of boiling vessels to drive off further nitric acid and to partially concentrate the dehydrating agent, passing the mixture from said boiling vessels still containing some nitric acid into a second fractionating tower and introducing steam into said second tower to drive off the remaining nitric acid, and passing all the vapors arising in said second fractionating tower together with the weak nitric vapors from the boiling vessels into the first fractionating tower to assist in heating the liquid therein.

STANLEY L. HANDFORTH.